(12) United States Patent
Fantinel et al.

(10) Patent No.: US 9,000,113 B2
(45) Date of Patent: Apr. 7, 2015

(54) POLYETHYLENE COMPOSITION AND METHOD FOR OBTAINING SAME

(75) Inventors: Fabiana Fantinel, Verona (IT); Shahram Mihan, Bad Soden (DE); Gerhardus Meier, Frankfurt (DE); Ulf Schueller, Frankfurt (DE); Maclovio Salinas Herrera, Frankfurt (DE); Giampaolo Pellegatti, Boara (DE); Gerd Mannebach, Münstermaifeld (DE)

(73) Assignee: Basell Polyolefine GmbH, Wesseling (DE)

( * ) Notice: Subject to any disclaimer, the term of this patent is extended or adjusted under 35 U.S.C. 154(b) by 204 days.

(21) Appl. No.: 13/700,120

(22) PCT Filed: May 26, 2011

(86) PCT No.: PCT/EP2011/002613
§ 371 (c)(1),
(2), (4) Date: Jan. 18, 2013

(87) PCT Pub. No.: WO2011/147574
PCT Pub. Date: Dec. 1, 2011

(65) Prior Publication Data
US 2013/0116392 A1 May 9, 2013

Related U.S. Application Data

(60) Provisional application No. 61/397,540, filed on Jun. 11, 2010.

(30) Foreign Application Priority Data

May 28, 2010 (EP) ..................................... 10005630
Jul. 14, 2010 (EP) ..................................... 10007278

(51) Int. Cl.
*C08F 210/16* (2006.01)
*C08F 4/80* (2006.01)
*C08F 4/76* (2006.01)
*C08L 23/08* (2006.01)
*C08F 4/619* (2006.01)
*C08F 4/6192* (2006.01)

(52) U.S. Cl.
CPC ........... *C08F 210/16* (2013.01); *C08F 4/61912* (2013.01); *C08F 4/61916* (2013.01); *C08F 4/61925* (2013.01); *C08L 23/0815* (2013.01)

(58) Field of Classification Search
CPC ............... C08F 210/16; C08F 2500/05; C08F 2500/17; C08L 23/0815
USPC .................. 526/348, 113, 172, 115, 116, 117, 526/169.1; 556/138
See application file for complete search history.

(56) References Cited

U.S. PATENT DOCUMENTS

| | | | |
|---|---|---|---|
| 5,008,204 A | 4/1991 | Stehling | |
| 6,391,977 B1 | 5/2002 | Yu et al. | |
| 8,846,188 B2 * | 9/2014 | Fantinel et al. | 428/220 |
| 2002/0058584 A1 | 5/2002 | Bennett et al. | |
| 2009/0306299 A1 | 12/2009 | Kipke et al. | |
| 2010/0310799 A1 | 12/2010 | Nozue et al. | |
| 2011/0217537 A1* | 9/2011 | Fantinel et al. | 428/220 |
| 2011/0230629 A1* | 9/2011 | Mihan et al. | 526/117 |
| 2013/0253126 A1* | 9/2013 | Ewart et al. | 524/528 |

FOREIGN PATENT DOCUMENTS

| | | |
|---|---|---|
| EP | 0447035 | 9/1991 |
| WO | WO-9303093 | 2/1993 |
| WO | WO-98/27124 | 6/1998 |
| WO | WO-2010034508 | 4/2010 |
| WO | WO-2010034520 | 4/2010 |

OTHER PUBLICATIONS

Mathot, et al., "Heat capacity, enthalpy and crystallinity of polymers from DSC and determination of the DSC peak base line", Thermochimia Acta, vol. 151 Sep. 1989 , 241-259.
Peacock, Andrew J. , "Handbook of Polyethylene", Exxon Chemical Company, Baytown, Texas Marcel Dekker Inc., New York/Basel 2000 , 7-10.
Wild, L , "Temperature rising elution fractionation", Adv. Polymer Sci. 98 1990 , 1-47.
Wild, L et al., "Determination of Branching Distributions in Polyethylene and Ethylene Copolymers", Journal Polymer Sci. Part B 1982 , 441-456.
Benoit, H. Rempp et al., "A Universal Calibration for Gel Permeation Chromatography", Journal of Polymer Sci., Phys. Ed. 5 1967 , 753-759.

* cited by examiner

*Primary Examiner* — Rip A Lee

(57) ABSTRACT

New plastomer material for use in automotive parts such as bumpers is devised here, which is a novel polyethylene produced by a gas phase process.

36 Claims, 1 Drawing Sheet

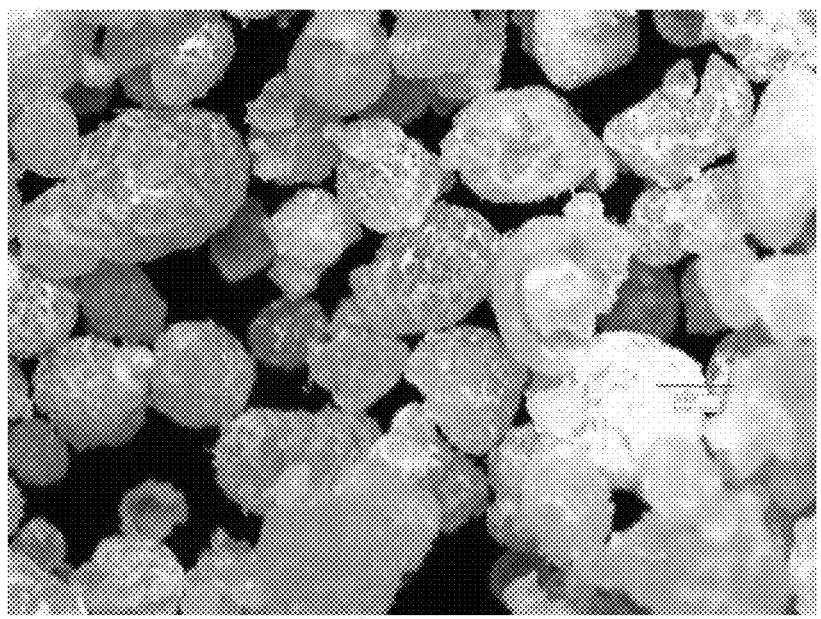
Caption for the scaling bar:
'length 429

POLYETHYLENE COMPOSITION AND METHOD FOR OBTAINING SAME

This application is the U.S. national phase of International Application PCT/EP2011/002613, filed May 26, 2011, claiming priority to European Patent Application 10005630.8 filed May 28, 2010, European Patent Application 10007278.4 filed Jul. 14, 2010, and the benefit under 35 U.S.C. 119(e) of U.S. Provisional Application No. 61/397,540, filed Jun. 11, 2010; the disclosures of International Application PCT/EP2011/002613, European Patent Application 10005630.8, European Patent Application 10007278.4 and U.S. Provisional Application No. 61/397,540, each as filed, are incorporated herein by reference.

The present invention relates to a novel low density, plastomeric polyethylene, obtainable from gas phase, and to a process for obtaining the same.

Plastomeric linear low density polyethylene-copolymers obtained by a solution process are known. Such plastomeric materials, of low to very low overall density, are used as impact modifiers by virtue of their elastic properties, e.g. in PP blends used for manufacturing bumpers in the automotive industry. Such low density, plastomeric materials are inherently sticky, the dry material easily aggregating and clogging. The inherent stickiness is no problem in solution process. However, the requirement of polymer solubility restricts the Mw range attainable for polymers produced with said solution process.

In gas phase, hitherto elastomeric and plastomeric materials could not be processed due the stickiness of the material leading to agglomeration and thus to fluidization problems, sheeting, the material simply not being straightforwardly operable in gas phase. Some solution found by Union Carbide in the past to solve this problem was: add Silica or carbon black. However, these additives affected the properties of the polyethylene thus produced, and hence are not desirable for routine use.

It was the object of the present invention to overcome the disadvantages of the prior art and to devise a novel plastomeric polyethylene composition, and as may be needed, identify catalyst system suitable for improved gas phase synthesis, drawn to synthesis of such polyethylene. This object was solved by the ensuing novel plastomeric, linear low or ultralow density polyethylene product of the present invention, obtainable therewith from gas phase. Further, a novel hybrid catalyst was used for producing the novel polymer composition.

According to the present invention, a polyethylene copolymer composition is devised, having a density of from 0.880 to 0.912 g/cm$^3$ as measured according to ISO1183-1::2004, preferably of from 0.895 to 0.905 g/cm$^3$ a Mw/Mn of 5<MWD<8, and an intrinsic viscosity in decalin at 135° C. as determined according to EN ISO 1628-3::2003, of from >1.6 dL/g, preferably of from 1.75 up to 2.5 dL/g, said copolymer composition being at least bimodal in comonomer distribution as determined by DSC analysis and having a high temperature melting peak in DSC (Tm2) at a temperature of from 126 to 131° C., and comprising at least one α-C4-C12-olefine comonomer.

Preferably, afore said polyethylene composition of the present invention has a shear flow rate or melt index MI (2.16 kg/190° C.) of from 0.5 to 4 g/10 min. as measured according to ISO 1133::2005, more preferably of from 1 to 3 g/10 min. In combination therewith, the dimensionless HLM1/MI ratio (sometimes coined flow rate ratio, FRR or the like) preferably is of from 20 to 25, wherein HLMI is the melt index at 21.6 kg load and 190° C., as equally comprised in said ISO 1133.

Basically, the novel polyethylene composition of the present invention comprises a low Mw HDPE component and a high Mw plastomeric component.

Without wanting to be bound by theory, it is believed that the addition of a specific, ultrahigh density PE fraction, indicated by the high temperature peak in DSC, modulates adhesiveness of the very VLLDPE portion of the product such as to avoid the typical problems previously encountered with plastomers in gas phase polymerization. Notably, the granular product exitting from reactor predominantly shows two types of granula, larger one to which, like perls on a necklace or a corona, smaller ones adhere to. All said granula of either size have a unusually rough, uneven surface, in contrast to LLDPE or MDPE products obtained with related catalyst systems from the gas phase. In particular, fines are absorbed by the residual, optimally balanced adhesive properties of the resin granula, resulting in a product having a surprisingly narrow, even particle size distribution. The adhesive strength still is minute enough as to avoid formation of larger particle aggregates, and hence clogging and sheeting in the reactor. This reduced adhesiveness is likely caused by the blending of a VLLDPE portion with a low molecular weight, HDPE portion in situ, both species preferably growing concomitantly on and from the same supported catalyst particles.—For short, it is the addition of a narrowly defined UHDPE material that allows of continuous, large scale operation of a gas phase reactor for obtaining the plastomer material of the invention.

BRIEF DESCRIPTION OF THE DRAWINGS

FIG. 1 shows a microscopical picture of resin of example 6 in the experimental section, as harvested from reactor. The irregular, rough surface and overall poorly spherical structure is clearly discernible, as well as potential fines adhering into ridges on the surface of the granula. Much smaller particles also adhere to the larger granula, which appear to be of comparatively uniform size in comparison thereo. The caption of the scaling bar (=~420 μm) has been magnified in a text box at the right hand side of the photograph, for readability.

Moreover, once feasibility of the gas phase route to plastomer is achieved, different from the solution processes preferred by the prior art, it is possible to obtain VLDPE plastomer product having a high molecular weight tail at high molecular weights >1 000 000 Da. This latter weight fraction is essential for achieving good processing properties for the product thus achieved, and is a property not achievable by prior art solution processes for such low density, plastomeric VLLDPE.

Suitable catalysts and catalyst systems respectively, co-catalyst additivation and preferred co-catalysts, suitable support materials and supportation methods as well suitable polymerisation methods have all been set forward in detail in WO 2010/034520 A1, incorporated herewith in full by reference.

Preferably, the polyethylene copolymer composition of the present invention has been produced in a single polymerization step in a gas phase reactor, more preferably in a fluidised bed gas phase reactor.

Further preferred, alone or in combination with the one of the above and below cited embodiments, the polyethylene composition has been produced in the presence of a mixed catalyst system comprising at least one metallocene, preferably comprising at least one zirconocene. More preferably, the polyethylene has been produced in the presence of at least one metallocene A) and at least one further non-metallocene, non-Ziegler, metallorganic transition metal complex catalyst B)

Preferably, the composition has a comonomer distribution index or CDBI of <65%. The CDBI is well known to the skilled person. CDBI (composition distribution breadth index) is a measure of the breadth of the distribution of copolymer composition, with regard to the level of comonomer incorporated into polymer, the latter reducing crystallinity of domains made from such polymer chains by means of short side chain branching as compared to crystalline homopolymer. This is described, for example, in WO 93/03093. The CDBI is defined as the percent by weight or mass fraction of the copolymer molecules having a comonomer contents of ±25% of the mean total molar comonomer content, i.e. the share of comonomer molecules whose comonomer content is within 50% of the average comonomer content. CDBI is determined by TREF (temperature rising elution fraction) analysis (Wild et al. J. Poly. Sci., Poly. Phys. Ed. Vol. 20, (1982), 441 or U.S. Pat. No. 5,008,204).

Preferably, the composition has at least two, preferably just two, peaks in DSC (Tm2), a first at high temperature of from 126.5 to 130° C., and a second at lower temperature of from 65 to 95° C. More preferably, the density for the polymer fraction corresponding to said second DSC peak, which second peak represents the Mc mass fraction of the polymer, is of from 0.870 to 0.905 g/cm3, preferably of from 0.880 to 0.900 g/cm$^3$, based on %-crystallinity calculated for the Mc part based on the melting enthalpy.

Preferably, the polyethylene of the invention encompasses a HDPE fraction, and wherein the HDPE weight fraction of the polyethylene composition is of from 5 to 40% (w/w), preferably is of from 7 to 30% (w/w), more preferably is of from 12 to 25% (w/w), most preferably is of from 14 to 22% (w/w) wherein said HDPE weight fraction is corresponding to polymer found in the DSC curve at temperatures above the temperature of a local minimum of the DSC curve inbetween 105 to 112° C., preferably above 110° C. in the DSC curve. Essentially, the HDPE fraction corresponds to polymer share giving rise to said high temperature melting peak observable in DSC at a peak temperature of or above 126° C. (and likewise detectable in CRYSTAF™ or TREF analysis), however, for purely definitory reason in the context of mathematically integrating the curve area above the baseline, a different threshold temperature is chosen herefore.

Preferably, alone or in combination with one the below or above described embodiments, the polymer fraction of the composition eluting in preparative TREF at a temperature of 85° C. or less, is comprising more than 0.5% by weight of polymer chains having a molecular weight of >1,000,000 Da, preferably is comprising more than 1. % by weight of such polymer chains. More preferably, said polymer fraction eluting at a temperature of 85° C. or less in TREF is having a comonomer contents of >5 mol-% preferably is having a comonomer contents of from 12 to 22 wt.-%. TREF analyzes comonomer distribution based on short side chain branching frequency essentially independent of molecular weight, based on the differential melting behaviour of the different phases in the semicrystalline polymer, the fractions having a lower % crystallinity eluting earlier (for method guidance, cp. detailed description in Wild, L., Temperature rising elution fractionation, Adv. Polymer Sci. 98: 1-47, (1990), for any issues not addressed in Wild, L., further refer to TREF description in U.S. Pat. No. 5,008,204 incorporated herewith by reference). For preparative TREF aiming to resolve the polyethylene composition of the present invention into two distinct fractions, a plastomer and a high density fraction which are subsequently subjected to measurement of instrinsic viscosity, a particular protocol was arbitrarily applied:

The following approach was applied in order to obtain a separation between the plastomeric fraction and the HDPE component. An amount of sample between 1 and 2 g was dissolved in 180 mL of o-xylene at 137° C., under stirring condition for about 1 h. This solution was then loaded in a steel column packed with an inert support and heated at the same temperature of the sample solution.

The crystallization of the polymer was carried out by cooling down linearly in 10 h from 137 to 77° C. The elution of the polymer was step-wise: at 77, 100 and 137° C. with o-xylene. Two sample fractions (77 and 100° C.) were recovered by precipitation with acetone and they were subsequently investigated with other analytical techniques. At 137° C. no polymer was found. The first fractions turns to be made of the plastomeric material, whereas the HDPE is found in the second one.

Preferably, according to the present invention, alone or in any combination with just some or all the afore and below mentioned embodiments, also the intrinsic viscosity of the Mc or plastomer part of the total polyethylene composition is at least 1.8 dL/g or above, preferably is of from 2.0 to 2.5 dL/g. Further preferred, in combination therewith, the dimensionless ratio of the intrinsic viscosities of the plastomer fraction divided by the high density fraction is >1.5, preferably is >1.9. More preferably, alone or in combination therewith, the intrinsic viscosity of the high density fraction is <2.0 dL/g, preferably is <1.3 dL/g.

Further preferred, in particular in combination with the preceding embodiment, a second polymer fraction eluting at a temperature of >85° C. in TREF is having a weight average molecular weight Mw<100,000 Da and a Mw/Mn of from 4 to 10.

Preferably, alone or in combination with one of the above embodiments, the polyethylene composition according to the present invention has a density of from 0.890 to 0.905 g/cm$^3$.

Preferably, alone or in combination with one of the above embodiments, the polyethylene composition has a P50 value of from 1100 to 1800 µm, and preferably a sieve analysis (90%/10%) span of particle size distribution of from >1 to 1.3. This particle size parameters, measured sieve sizing, are well routinely determined by the skilled person.

Further objects of the present invention are the use of the polyethylene of the present invention, as described above by any of the above described embodiments or any combination thereof, for producing a fiber or moulding, further a polymer blend comprising said polyethylene, said blend being preferably for use in making vehicle bumpers, of any size, for automotive applicances, in particular and most preferably for cars, trucks, busses or lorries. Applications examples of such can be found in U.S. Pat. No. 6,391,977 B1, for instance; the polyethylene composition of the present invention is mainly to be used as such an impact modifier material, replacing the prior art modifier materials used in said US'977.

Experimental Section

The determination of temperature ($2^{nd}$ heat of melting, Tm2) and enthalpy of melting and crystallization was carried out by differential scanning calorimetry (DSC) using a method described in ISO 11357-3:1999(E) on a DSC Q2000 (TA Instruments, Helfmann-Park 10, 65760 Eschborn) with a heating and cooling rate of 20 K/min and indium for calibration. Data processing and calculation was carried out using TA Universal Analysis 2000 (TA Instruments, Helfmann-Park 10, 65760 Eschborn). The sample holder, an aluminum pan, is loaded with 5 to 6 mg of the specimen and sealed. The sample is then heated from ambient temperature to 200° C. with a heating rate of 20 K/min (first heating). After a holding time of 5 minutes at 200° C., which allows complete melting of the crystallites, the sample is cooled to −10° C. with a cooling rate of 20 K/min and held there for 2 minutes. Finally the sample is heated from −10° C. to 200° C. with a heating rate of 20 K/min (second heating). After construction of a baseline the area under the peak of the second heating run is measured and the enthalpy of fusion (ΔHf) in J/g is calculated according to said ISO 11357-3 (1999). To calculate the HDPE fraction (HDPE %, split) of the polymer a perpendicular is dropped to the baseline at the local minimum of the curve if it is between 105 and 112° C. If the peaks are not separated or the minimum is lower than 105° C. the perpendicular is dropped at 110° C. The area under the peak from the perpendicular to the high temperature end of the DSC curve is measured and the enthalpy $\Delta H_{2,\ HD}$ calculated. $\Delta H_{2,\ HD}$ is divided by 220 J/g to result the HDPE fraction of the polymer.

For determining the density of the lower temperature peak fraction of the polymer, otherwise routinely coined the Mc part (for Mass of polymer fraction showing crystalline melting, obtainable by dividing the heat of melting for that Mc part [J] by the specific crystallization enthalpy [J/g]), firstly the crystallinity is determined, firstly the % Crystallinity is determined from the melting endotherm using Universal Analysis software, based upon a value Hc of 293 J/g for the 100% crystalline material (R. Blaine, TA Instruments—document TA123, 'Determination of Polymer Crystallinity by DSC', also cp. Mathot et al., Heat capacity, enthalpy and crystallinity of polymers from DSC and determination of the DSC peak base line, Thermochimia Acta, Vol. 151, September 1989, p. 241-259). As is well known, the crystallinity of polymer correlates strictly with density; for interconversion of the % crystallinity into density value, the formula density d [g/cm3] =crystallinity [%]·0.0014 [g/cm3]+0.854 was used.

The molar mass distribution width (MWD) or polydispersity is defined as Mw/Mn. Definition of Mw, Mn, Mz, MWD can be found in the 'Handbook of PE', ed. A. Peacock, p. 7-10, Marcel Dekker Inc., New York/Basel 2000. The determination of the molar mass distributions and the means Mn, Mw and Mw/Mn derived therefrom was carried out by high-temperature gel permeation chromatography using a method described in DIN 55672-1:1995-02 issue February 1995. The deviations according to the mentioned DIN standard are as follows: Solvent 1,2,4-trichlorobenzene (TCB), temperature of apparatus and solutions 135° C. and as concentration detector a PolymerChar (Valencia, Paterna 46980, Spain) IR-4 infrared detector, capable for use with TCB.

A WATERS Alliance 2000 equipped with the following precolumn SHODEX UT-G and separation columns SHODEX UT 806 M (3×) and SHODEX UT 807 connected in series was used. The solvent was vacuum destilled under Nitrogen and was stabilized with 0.025% by weight of 2,6-di-tert-butyl-4-methylphenol. The flowrate used was 1 ml/min, the injection was 500 µl and polymer concentration was in the range of 0.01%<conc.<0.05% w/w. The molecular weight calibration was established by using monodisperse polystyrene (PS) standards from Polymer Laboratories (now Varian, Inc., Essex Road, Church Stretton, Shropshire, SY6 6AX,UK) in the range from 580 g/mol up to 11600000 g/mol and additionally Hexadecane. The calibration curve was then adapted to Polyethylene (PE) by means of the Universal Calibration method (Benoit H., Rempp P. and Grubisic Z., in J. Polymer Sci., Phys. Ed., 5, 753 (1967)). The Mark-Houwing parameters used herefore were for PS: kPS=0.000121 dl/g, αPS=0.706 and for PE kPE=0.000406 dl/g, αPE=0.725, valid in TCB at 135° C. Data recording, calibration and calculation was carried out using NTGPC_Control_V6.02.03 and NTGPC_V6.4.24 (HS—Entwicklungsgesellschaft für wissenschaftliche Hard-und Software mbH, Hauptstraße 36, D-55437 Ober-Hilbersheim) respectively. Further with relevance to smooth, convenient extrusion processing at low pressure, preferably the amount of the polyethylene of the invention with a molar mass of <1 Mio. g/mol, as determined by GPC for standard determination of the molecular weight distribution, is preferably above 95.5% by weight. This is determined in the usual course of the molar mass distribution measurement by applying the WIN-GPC' software of the company 'HS-Entwicklungsgesellschaft für wissenschaftliche Hard-und Software mbH', Ober-Hilbersheim/Germany, see supra.

Applying the universal calibration method based on the Mark-Houwink constants given above may additionally be nicely and comprehensibly inferred in detail from ASTM-6474-99, along with further explanation on using an additional internal standard-PE for spiking a given sample during chromatography runs, after calibration.

Particle sizing, for determination of P50 and/or particle span, was carried out according to ISO 9276-1::2004.

Analysis of comonomer contents of polyethylene was carried out according to ASTM D6645-01 (2010).

Another object of the invention is a Mixed catalyst, comprising as a first catalyst Bis(1-n-butyl-3-methyl-cyclopentadienyl)zirconium dihalogenid and as a second catalyst 2,6-Bis[1-(2-Chlor-4,6-trimethylphenylimino)ethyl]pyridine iron(II) dihalogenid, wherein the halogenid is selected from the group consisting of fluoride, chloride and bromide, more preferably is selected from the group consisting of fluoride or chloride, most preferably wherein the halogenid is chloride. Again in a further preferred embodiment, the mixed catalyst is carried on a joint, solid support material which support preferably is an anorganic, refractory oxide. A joint support material is to be understood as to be coated with at least two different catalyst species, that is jointly with the different catalysts constituting the mixed catalyst system.

Preparation of the Mixed Catalyst Systems:
Complexes 1 and 2 were Used for the Catalyst Preparation
Complex 1 is Bis(1-n-butyl-3-methyl-cyclopentadienyl)zirconium dichloride is commercially available from Albemarle Inc.
Complex 2 is 2,6-Bis[1-(2-Chlor-4,6-trimethylphenylimino) ethyl]pyridine. It was prepared as in example 1 of WO 98/27124 and reacted in an analogous manner with iron(II) chloride to said complex 2.
Methylalumoxane (MAO) was received from Chemtura Inc. as a 30% (w/w) toluene solution.
Support:
XPO-2326A, a Spray-Dried Silica Gel from Grace
Support pretreatment XPO-2326 A was calcinated at 600° C. for 6 hours.
Preparation of the Catalyst System:
In a 3.09 L reactor A kg MAO (4.75 M in Toluol, 0.78 mol) were added. In a separated 0.5 L flask B gr complex 1 were mixed with C gr complex 2. The powder was transferred to the 3.09 L steel reactor and the flask flushed with 500 ml Toluene. The volume of the solution was 105% of that of the pores of the support.
The mixture was stirred cooled to −30° C. for one hour, then poured into the 10 L reactor very slowly, i.e. "dropwise". The mixture was stirred for 1 h. Then heptane was added to the catalyst volume of the solution was 250% of that of the pores of the support so that a slurry was optained. The slurry of the catalyst was stirred for 30 min. The catalyst has been washed with filtered and dryed with nitrogen flow till obtaining a free flowing powder with an ivory colour.
The ratio of loadings of complex 1 and that of complex 2 is E µmol/g:µmol/g and the Al/(complex 1+complex 2) ratio is F:1 mol:mol.

| Catalyst | A MAO Kg | B complex1 gr | C complex2 gr | E compl1:compl2 µmol/g:µmol/g | F Al:M |
|---|---|---|---|---|---|
| 1 | 5.8 | 25.4 | 114.5 | 9/53 | 85 |
| 2 | 5.8 | 46.6 | 114.5 | 17/53 | 95 |
| 3 | 5.8 | 19.8 | 114.5 | 7/53 | 98 |

Polymerisation Process:

Samples have been produced in Gas Phase fluidized bed continuous process. Process details are given in Table 1. The catalyst was metered into the reactor discontinuously by means of pressurized nitrogen. The reactor pressure was controlled at 24 barg (bar gauge, i.e. relative pressure increase above atmospheric pressure). The average polyethylene output of the gas-phase fluidized bed reactor was 5 kg/h (Details in Table 1). The hold-up in the reactor was controlled to be 15 kg, giving a residence time of 3 hours in the reactor. Gas velocity was 0.35 m/s. As an antistatic, 12 ppm (based on PE) Costelan AS100 were fed, though antistatics surprisingly proved not to be a mandatory element for the plastomer application, in contrast to higher density product. Still the antistatic contributed to maximising mileage. High mileage was achieved, no sheeting was observed during reactor operation. The discharged polymer was dried in a continuous way by flushing it with nitrogen.

Catalyst 1. produced sample 1, 2, 3, 4, 6

Catalyst 2 sample 4, catalyst 3 for sample 7

The polymerization conditions used in the examples are given in following Table 1:

Powder Morphology Related Data are Reported in Table 3 Below:

| Sample | 1 | 2 | 3 | 5 | 6 | 7 |
|---|---|---|---|---|---|---|
| P50[microns] | 1654 | 1589 | 1655 | 1218 | 1364 | 1378 |
| Sieve analysis Span | 1.04 | 1.14 | 1.03 | 1.16 | 1.24 | 1.1 |
| Bulk density [g/cm³] | 349 | 365 | 339 | 371 | 376 | 347 |

Instrinic viscosity data, as obtainable after separation by preparative TREF, are reported in Table 4 below:

| Sample | 1 | 2 | 3 | 5 | 6 | 7 |
|---|---|---|---|---|---|---|
| IV Mc [dl/g] | 1.8 | 2.0 | 2.0 | 2.0 | 2.2 | 2.3 |
| IV HDPE[dl/g] | 1.0 | 10 | 1.0 | 1.0 | 1.0 | 1.0 |
| IV plastomer/IV HDPE | 1.8 | 2.0 | 2.0 | 2.0 | 2.2 | 2.3 |

Sample material further homogenized, additivated and granulated by means of gear-pump extruder, showed excellent mechanical properties as expected for a platomeric impact modifier material, as is reported in Table 5 below:

Extruder: LCM50
Schneckentyp: E-1H
Temperatur Drossel: 192° C.
Durchsatz: 63 [kg/h]
Saugdruck: 0.5 [bar]
Drehzahl: 1000 [U/min]
Spez. Energie: 0.184 [kW/kg]

| | Product type | | | | | | |
|---|---|---|---|---|---|---|---|
| | C2C6 | | | | C2C4 | | |
| Sample | 1 | 2 | 3 | — | 5 | 6 | 7 |
| Mileage [g/g] | 6300 | 6400 | 6500 | — | 7540 | 7500 | 8400 |
| Temperature [° C.] | 80 | 80 | 70 | — | 73 | 73 | 73 |
| Ethylene [Vol %] | 57 | 58 | 49.5 | — | 51 | 51 | 54.7 |
| Hexene/butene [Vol %] | 3.7 | 4.2 | 2.3 | — | 15 | 15.3 | 13.9 |
| Ethylene [kg/h] | 5.8 | 5.5 | 5.5 | — | 5.5 | 4.5 | 5.1 |
| Hexene/butene [kg/C2 kg] | 0.2 | 0.2 | 0.25 | — | 0.25 | 0.25 | 0.25 |
| Hydrogen [ppm based on PE] | 36 | 0 | 34 | — | 23 | 23 | 22 |
| Output [kg/h] | 4.6 | 4.8 | 4.9 | — | 4.2 | 4.1 | 4.5 |
| MFR 2.16 kg [g/10 min] | 2.7 | 1.1 | 2 | — | 1.4 | 1.2 | 0.9 |
| Density [g/cm³] | 0.912 | 0.912 | 0.902 | — | 0.911 | 0.909 | 0.903 |
| Split HDPE [%] | 24 | 23 | 20 | — | 27 | 25 | 15 |

Product Details are Reported in Table 2

| Sample | 1 | 2 | 3 | 5 | 6 | 7 |
|---|---|---|---|---|---|---|
| IV [dL/g] | 1.64 | 1.81 | 1.81 | 1.75 | 1.89 | 2.09 |
| GPC Mw [g/mol] | 95592 | 137842 | 108350 | 104269 | 116809 | 122324 |
| GPC Mw/Mn | 5.2 | 7.19 | 6.25 | 6.67 | 6.97 | 5.25 |
| HDPE[%] from DSC | 24 | 23 | 20 | 27 | 25 | 15 |
| C6 (C4) IR [%] | (C6) 12 | (C6) 11 | (C6) 14 | (C4) 12 | (C4) 12 | (C4) 14 |
| Density Mc part [g/cm³] | 0.898 | 0.896 | 0.888 | 0.893 | 0.892 | 0.893 |
| C6 Mc [%]/IV Mc [dl/g] | 16/1.8 | 14/2.0 | 18/2.0 | 18/2.0 | 17/2.2 | 19/2.3 |
| DSC Tm2 [° C.] I | 127.4 | 127.2 | 126.78 | 127.5 | 127.7 | 126.9 |
| DSC Tm2 [° C.] II | 89 | 88 | 81 | 74 | 70 | 78 |
| DSC ΔH2 [J/g] | 92.1 | 92.4 | 79 | 95 | 85 | 70 |
| Density total polymer [g/cm³] | 0.912 | 0.912 | 0.902 | 0.911 | 0.909 | 0.903 |
| MFR 190° C., 2.16 kg [g/10'] | 2.7 | 1.2 | 2 | 1.4 | 1.2 | 0.9 |

Drehmoment: 111 [Nm]
Additivation with with:
500 ppm Ca-Stearat
1600 ppm Hostanox PAR 24 FF
800 ppm Irganox 1010
500 ppm Zn-Stearat

TABLE 5

Mechanical Test Performance

| | Sample | | | | |
|---|---|---|---|---|---|
| | 1 | 2 | 3 | 4 | 5 |
| AZK 23° C. [kJ/m$^2$] | 374 | 387 | 349 | 316 | 319 |
| AZK 23° C. Stabw. | 18.9 | 56 | 24 | 25 | 24 |
| AZK −30° C. [kJ/m$^2$] | 412 | 379 | 404 | 516 | 389 |
| AZK −30° C. Stabw. | 23 | 16.4 | 21 | 92 | 25 |
| Charpy aCN −40° C. [kJ/m$^2$] | no break | no break | no break | no break | no break |
| Charpy aCN 20° C. [kJ/m$^2$] | no break | no break | no break | no break | no break |
| Shore Hardness A | 96 | 92 | 94 | 96 | 94 |
| Shore Hardness A Stabw. | 0.5 | 3.3 | 2.8 | 0.5 | 2.3 |

The invention claimed is:

1. A polyethylene copolymer composition, having a density of from 0.880 to 0.912 g/cm$^3$, a Mw/Mn of 5<MWD<8, and an intrinsic viscosity in decalin at 135° C. as determined according to EN ISO 1628-312003 of from >1.6 dL/g, said copolymer composition having a high temperature melting peak in DSC (Tm2) at a temperature of from 126 to 131° C., and comprising at least one C4-C12-α-olefin comonomer.

2. The polyethylene composition of claim 1, wherein the polyethylene composition has been produced in a single polymerization step in a gas phase reactor.

3. The polyethylene composition of claim 2 wherein the gas phase reactor is a fluidized bed gas phase reactor.

4. The polyethylene composition of claim 1, wherein the polyethylene composition has been produced in the presence of a mixed catalyst system comprising at least one metallocene.

5. The polyethylene composition of claim 4, wherein the polyethylene has been produced in the presence of at least one metallocene A) and at least one further non-metallocene, non-Ziegler, metallorganic transition metal complex catalyst B).

6. The polyethylene composition according to claim 1, wherein the composition has at least two, peaks in DSC (Tm2), a first at high temperature of from 126.5 to 130° C., and a second at lower temperature of from 65 to 95° C.

7. The polyethylene composition according to claim 6, wherein the density for the polymer fraction corresponding to said second DSC peak, which second peak represents the Mc mass fraction of the polymer, is from 0.870 to 0.905 g/cm3, based on %-crystallinity calculated for the Mc part based on the melting enthalpy.

8. The polyethylene composition of claim 7 wherein the density of the polymer fraction corresponding to the second DSC peak is from 0.880 to 0.900 g/cm$^3$.

9. The polyethylene composition of claim 6 comprising only two peaks in DSC.

10. The polyethylene composition of claim 1, wherein the polyethylene composition is at least bimodal, in comonomer distribution as determined by DSC analysis, and/or wherein the composition has a CDBI of <65%.

11. The polyethylene composition of claim 10 wherein the composition is bimodal.

12. The polyethylene composition of claim 1, wherein polyethylene composition comprises from 5 to 40% (w/w), of a HDPE weight fraction, and said HDPE weight fraction corresponds to polymer found in the DSC curve at temperatures above the temperature of a local minimum of the DSC curve in between 105 to 112° C.

13. The polyethylene composition of claim 12 wherein the local minimum of the DSC curve is above 110° C.

14. The polyethylene composition of claim 12 wherein the HDPE weight fraction is from 7 to 30%.

15. The polyethylene composition of claim 14 wherein the HDPE weight fraction is from 10 to 22%.

16. The polyethylene composition according to claim 1, wherein in preparative TREF analysis, the polymer fraction of the composition eluting in TREF at a temperature of 85° C. or less, comprises more than 0.5% by weight of polymer having a molecular weight of >1,000,000 Da.

17. The polyethylene composition according to claim 16, wherein said polymer fraction eluting at a temperature of 85° C. or less in TREF has a comonomer contents of >5 mol %.

18. The polyethylene composition according to claim 16, wherein a second polymer fraction eluting at a temperature of >85° C. in TREF has a weight average molecular weight<100,000 Da and a Mw/Mn of from 4 to 10.

19. The polyethylene composition according to claim 1, wherein the density of the polyethylene composition is from 0.890 to 0.905 g/cm$^3$.

20. The polyethylene composition according to claim 1, wherein the polyethylene has a P50 value of from 1100 to 1800 μm.

21. The polyethylene composition of claim 20 having a sieve analysis (90%/10%) span of particle size distribution from 1 to 1.3.

22. The polyethylene composition of claim 1 wherein the C4-C12-α-olefin comonomer is a linear C4-C6-1-alkene.

23. The polyethylene composition of claim 22 wherein the C4-C6-1-alkene is selected from at least one of 1-butene or 1-hexene.

24. The polyethylene composition of claim 1 wherein the intrinsic viscosity is from 1.75 to 2.5 dL/g.

25. A fiber or molding comprising the polyethylene composition according to claim 1.

26. A polymer blend comprising the polyethylene of claim 1.

27. A process comprising polymerizing monomers in a polymerization reaction, carried out with a catalytic system comprising at least two transition metal complex catalysts in a single gas phase reactor, the process optionally comprising a prepolymerisation step, thereby forming a polyethylene according to claim 1.

28. The polymerization process according to claim 27, wherein the catalytic system does not comprise a Ziegler catalyst and wherein a first catalyst A) is a metallocene catalyst and wherein a second catalyst B) is a non-metallocene, transition metal complex catalyst.

29. The polymerization process according to claim 28, wherein the second catalyst B) is a polymerization catalyst based on an iron catalyst complex having a tridentate ligand comprising at least two aryl radicals.

30. The polymerization process of claim 27, wherein the gas phase reactor is a fluidized bed gas phase reactor, and further wherein the particle size is controlled during polymerisation to have a P50 value of from 1100 to 1800 μm.

31. The polymerization process of claim 30 wherein the particle size has a sieve analysis span (90%/10%) of particle size distribution from 1 to 1.3.

32. The polymerization process of claim 27 wherein the polymerisation is carried out in the absence of carbon black or of any inorganic, solid particulate other than particles of supported catalyst.

33. A mixed catalyst comprising as a first catalyst bis(1-n-butyl-3-methyl-cyclopentadienyl)zirconium dihalogenide and as a second catalyst 2,6-bis[1-(2-Chlor-4,6-dimethylphenylimino)ethyl]pyridine iron(II) dihalogenide, wherein the halogenide is selected from the group consisting of fluoride, chloride and bromide.

34. The mixed catalyst of claim 33, which is carried on a joint, solid support material, the support being an inorganic, refractory oxide.

35. The mixed catalyst of claim 33 wherein the halogenide is selected from the group consisting of fluoride and chloride.

36. The mixed catalyst of claim 35 wherein the halogenide is chloride.

* * * * *